Jan. 9, 1934. J. BOHLI 1,943,157

MAGNETO

Filed Dec. 22, 1930

Inventor:
Jakob Bohli

Patented Jan. 9, 1934

1,943,157

UNITED STATES PATENT OFFICE 1,943,157

MAGNETO

Jakob Bohli, Solothurn, Switzerland, assignor to Scintilla Aktiengesellschaft, Solothurn, Switzerland Application December 22, 1930, Serial No. 504,106, and in Germany March 10, 1930

1 Claim. (Cl. 123—149)

This invention relates to adjusting devices, such as are used with the break couplings of magneto-electric ignition apparatus. Although in arrangements of this kind means have been proposed, by increasing or diminishing the size of the gaps in which the pawls of the break coupling engage, for converting the intermittent forward motion of the rotor of the magneto apparatus into a continuous rotary motion even at a low speed of rotation, that is to say, at a speed of rotation which reaches the maximum starting speed of the engine, in such arrangements no means have become known for changing the moment in which the pawls engage and thereby influencing the moment of disengagement of the pawls and consequently the moment of the interruption of the primary current in relation to the position of the piston. Furthermore, in the known arrangements of this kind, no provision is made for altering the above-mentioned adjustment of the gap for the pawl of the break coupling within any desired limits. In the arrangement according to the present invention this is possible within the widest limits and, in addition to this, according to the invention a connection is established by fine toothed gearing which is disposed entirely within the coupling casing, by which connection the parts of the adjusting device which are rotatable relatively to one another are rigidly connected together in a positive manner.

According to the present invention the radially inwardly directed flange of the annular segment connected to the coupling casing and of the annular segment which is rotatable in the coupling casing is provided with axially directed fine teeth, and the fixing disc with which the two annular segments and the coupling casing are fixed to the magneto is provided on its outer, also radially extending edge with axially directed fine teeth which mesh with those of the two annular segments.

In the accompanying drawing a constructional example of the invention is shown.

In the figures, A is the casing of the coupling which acts as an intermediary between the magneto and the drive applied at X. The shaft S is keyed into the member G which holds the inner end of the spring H. The outer end of the spring H is attached to the member F on which is clamped the driving forks X, so that the members F and G are coupled by means of the spring H.

The pawls J and K are pivoted between double extensions U and T respectively which are integral with the member G which rotates with the magneto. In order at low speeds of the engine to produce a faster rate of cutting the lines of force, the member G is periodically stopped and released although the engine speed may be constant, so that upon the periodical release the spring H as well as the torque of the engine acts upon the magneto armature. This action is obtained by providing an abutment for the pawls J and K and means L and L' attached to the member F for releasing them.

In the magneto casing screws D, E, Y, Z are provided which fix a disc C with respect to the casing. This disc C is provided with radially directed fine teeth around its rim which mesh with similar teeth B on two segments M and M' lying inside the coupling casing A. One of these segments M is riveted to the coupling casing A while the other may be held in different positions. By tightening the screws D, E, Y, Z the members A, C, M and M' are fixed in any position in which they are placed.

Figure 3:
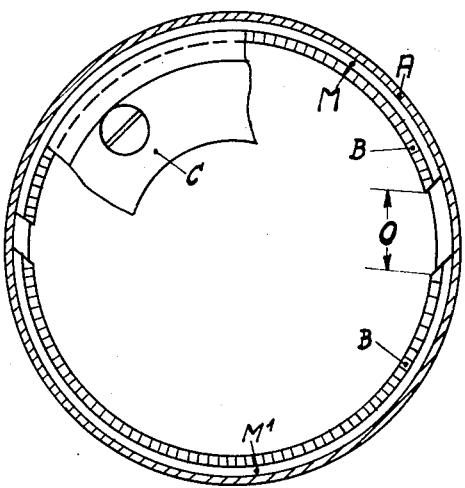
Figure 3 shows the members of the coupling in which lies the invention.
Figure 4:
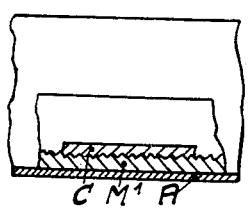
Figure 4 shows the members A, M', C as cut by the line III—III in Figure 1 and illustrates the meshing of the radially directed fine teeth to be later described.

Figure 3 shows a plan of the two segments in the coupling casing when detached from the apparatus, and it also shows a part of the disc C which holds the segments and casing rigid with respect to the magneto casing.

Figure 1:
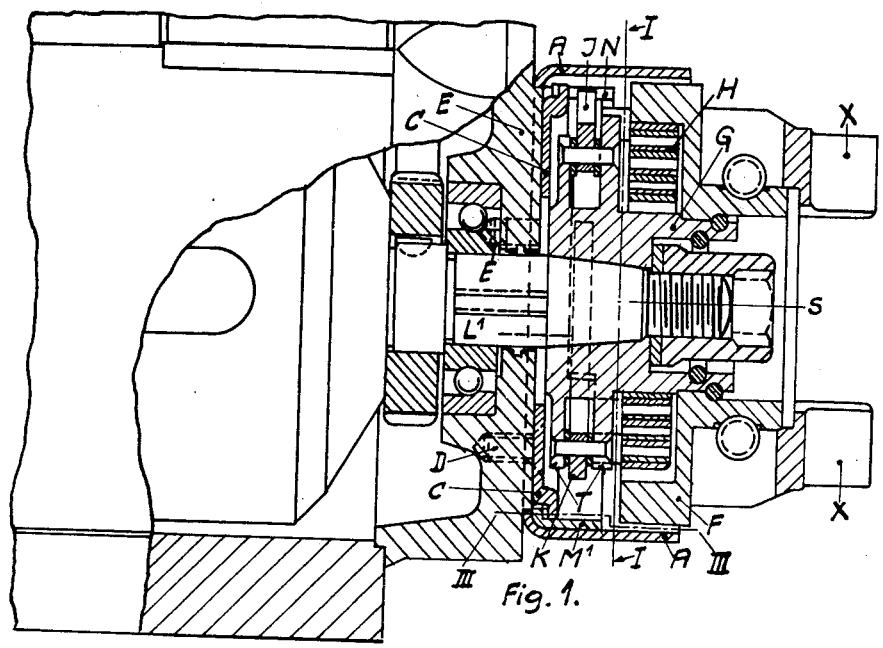
Figure 1 shows a section of a magneto coupling fastened to a magneto casing, which is partly cut away.
Figure 2:
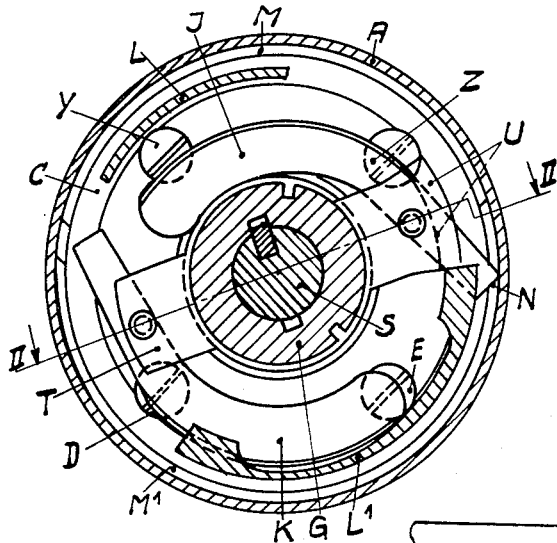
Figure 2 is the section obtained on the line I—I of Figure 1 and also shows the line II—II on which the section of Figure 1 is taken.

Figure 2 shows the pawl J abutting against the surface N of the segment M'. As the rotation of F continues the member L' leaves the extension U and the spring is further tensioned. Eventually the member L causes the pawl J to rotate slightly and its end to slide off the abutment surface N of the segment M' upon which the magneto rotor turns until the pawl K abuts against the surface N, when the process is repeated.

By easing the screws D, E, Y, Z sufficiently for the disengagement of the various axially directed teeth, the coupling casing A and with it the two annular segments M and M' can be displaced in the peripheral direction for influencing the moment of disengagement of the break coupling and consequently the interruption of the primary current in relation to the piston position. By a relative rotation of the annular segment M' with respect to M, that is to say by increasing or diminishing the gap O between these two annular segments, the moment is adjusted, in a known manner, in which the pawls no longer engage at a low speed of rotation, the adjustment being made such that the pawls will just engage at a speed of rotation corresponding to the maximum starting speed of the internal combustion engine. At speeds of rotation lying above this speed, engagement will then no longer take place, the time having become too short, during which the pawl passes in front of this gap O, and at high speeds of rotation the engagement of the pawls is furthermore automatically suspended by the centrifugally acting weight of the pawls.

What I claim is:

An adjusting device for break couplings of magneto electric ignition apparatus comprising a coupling casing, an annular segment rigidly connected to the coupling casing and having a radially inwardly directed toothed flange, an annular segment rotatable in the coupling casing and provided with axially directed fine teeth, a fixing disc securing the two annular segments and the coupling casing to a magneto, said disc being provided on its outer radially extending edge with axially directed teeth meshing with the teeth of the two annular segments.

JAKOB BOHLI.